United States Patent [19]

Yamazaki et al.

[11] 4,059,046

[45] Nov. 22, 1977

[54] APPARATUS FOR MANUFACTURING A SNACK FOOD WHOSE RAW MATERIAL IS FRUITAGE OR VEGETABLES

[75] Inventors: Tatsuo Yamazaki, Hikari; Takemi Hayashida, Hino; Masatoshi Sakuma, Nagareyama, all of Japan

[73] Assignee: Kanro Co. Ltd., Tokyo, Japan

[21] Appl. No.: 702,187

[22] Filed: July 2, 1976

[51] Int. Cl.² .................. A47J 37/12; F25D 25/04; A23B 1/00
[52] U.S. Cl. .................. 99/355; 99/405; 99/470; 99/472; 62/380; 198/952
[58] Field of Search .................. 99/403–409, 99/355, 470, 472; 165/120; 62/DIG. 1, 378, 380; 198/952, 347

[56] References Cited

U.S. PATENT DOCUMENTS

| | | | |
|---|---|---|---|
| 3,736,862 | 6/1973 | Crommelijnck | 99/405 |
| 3,812,775 | 5/1974 | Sijbring | 99/407 |
| 3,824,917 | 7/1974 | Kawahara | 99/404 |
| 3,927,715 | 12/1975 | Castanoli | 165/120 |

FOREIGN PATENT DOCUMENTS 308,742  9/1971  U.S.S.R. .................. 99/470

*Primary Examiner*—Harvey C. Hornsby
*Assistant Examiner*—Robert Pous
*Attorney, Agent, or Firm*—Hans Berman

[57] ABSTRACT

Apparatus for manufacturing a snack food whose raw material is fruitage or vegetables, comprising a vacuum tank into which a material of fruit or vegetable subjected to preprocessing such as cleaning, peeling, seasoning and drying is fed and within which the operation of frying the material and the operation of cooling and solidifying the fried material can be continuously carried out.

3 Claims, 5 Drawing Figures

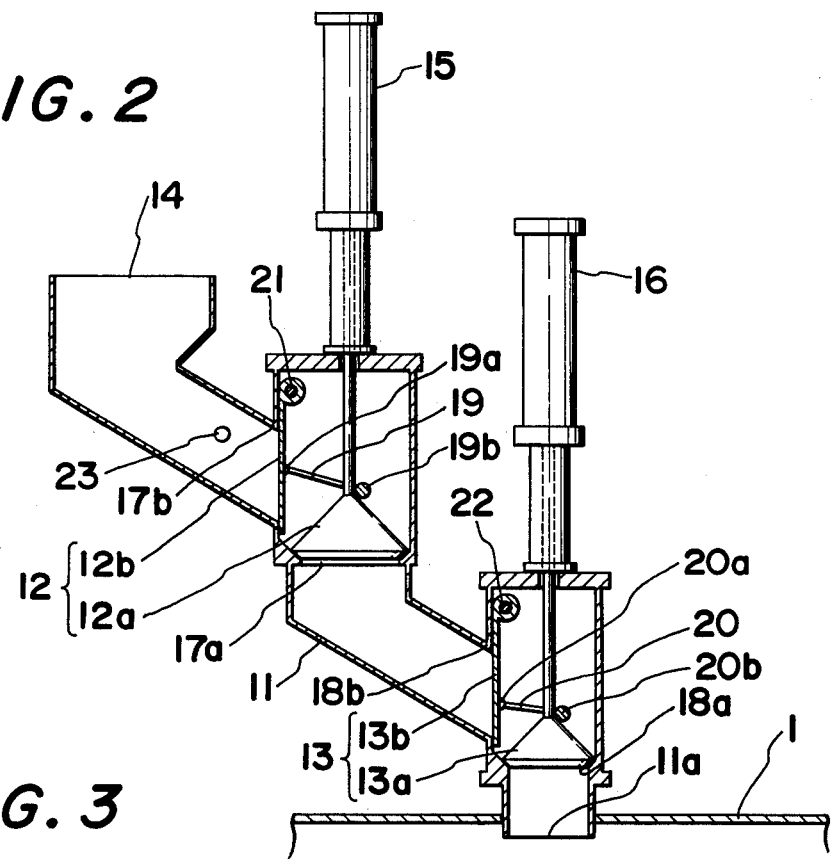
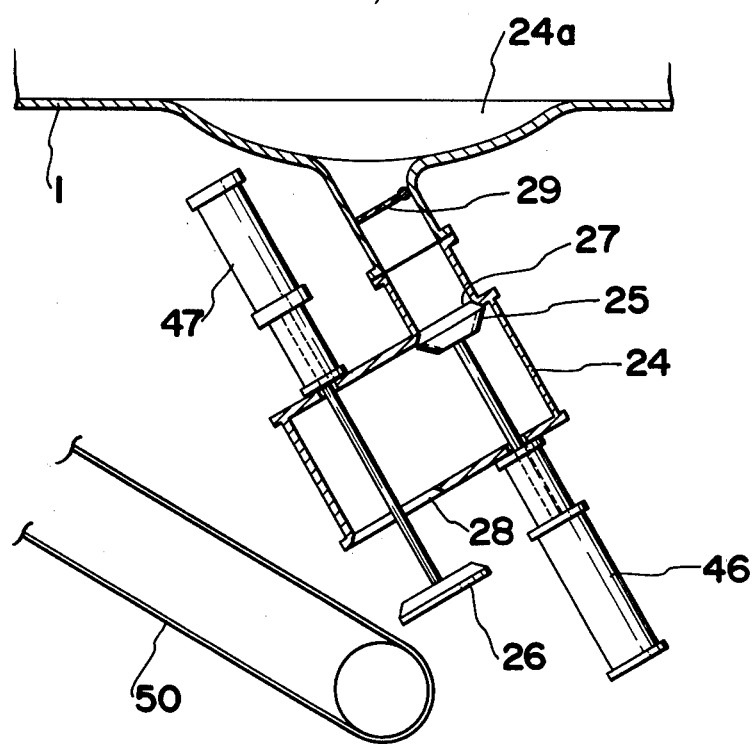

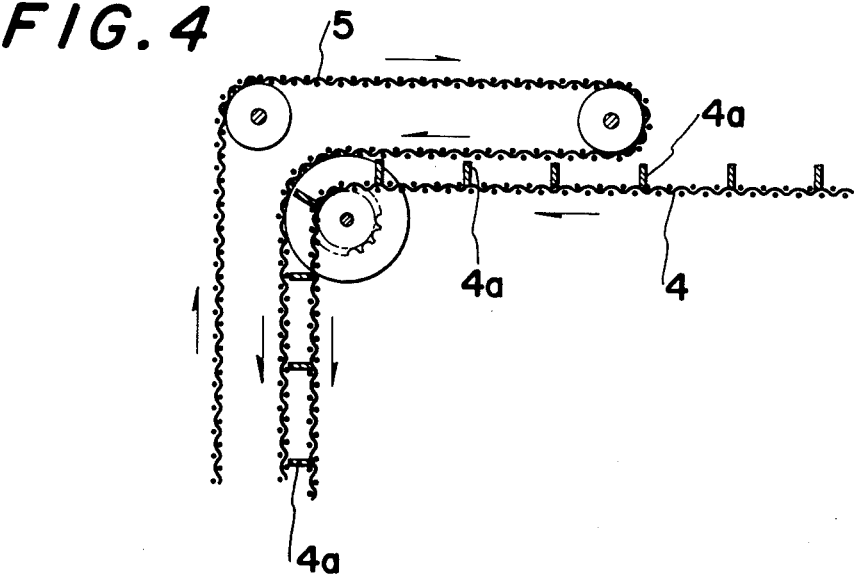
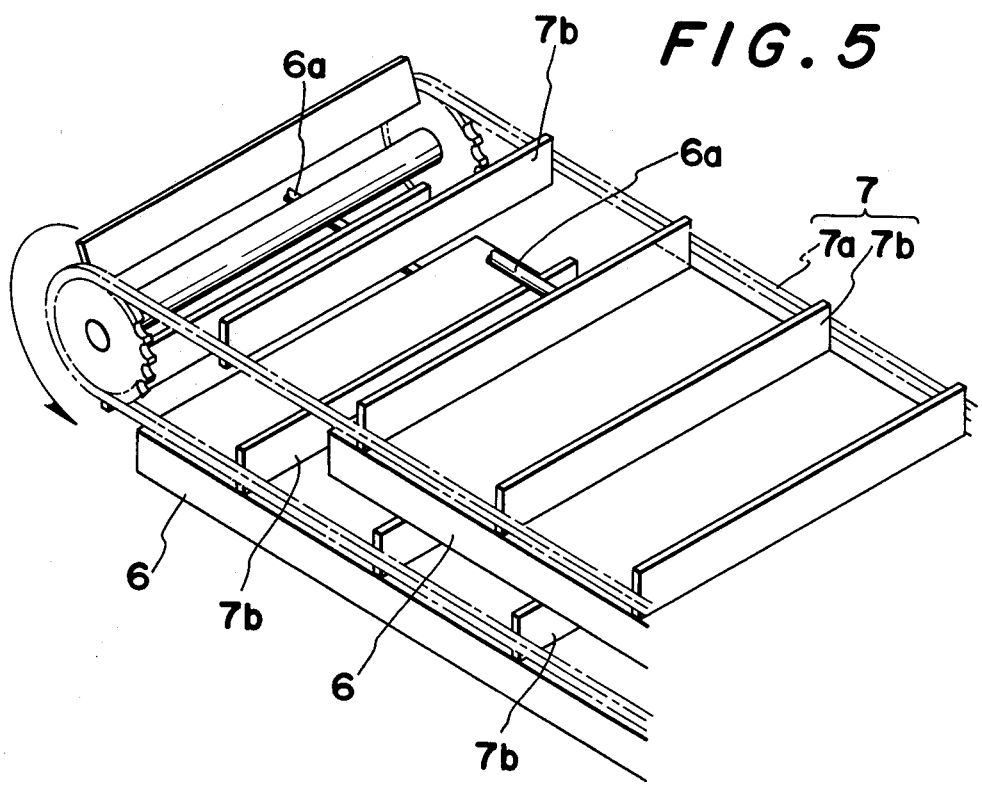

APPARATUS FOR MANUFACTURING A SNACK FOOD WHOSE RAW MATERIAL IS FRUITAGE OR VEGETABLES

This invention relates to apparatus for continuously manufacturing a snack food from a fruit such as apple and grape or a vegetable such as potato which is processed without losing its natural flavor and color. More particularly, the invention provides apparatus wherein a raw material is fried in a vacuum, and the fried material is cooled and solidified in an expanded state in the vacuum.

Apparatus for manufacturing a snack food according to this invention includes a vacuum tank whose interior is divided into a frying zone and a cooling zone; an oil tank in the frying zone; a frying conveyor at least partly immersed in the oil tank; cooling panels disposed in the cooling zone; cooling conveyors associated with the cooling panels and moving along upper surfaces of the panels; a conveyor supporting the material conveyed by the frying conveyor; a transfer conveyor arranged between the supporting conveyor and the cooling conveyors; an air lock for introducing the material to be processed into the frying zone; and another air lock for discharging the processed material from the cooling zone.

An embodiment of the invention will be described in detail with reference to the accompanying drawing in which:

FIG. 2 is an enlarged sectional view of an air lock;

FIG. 3 is an enlarged sectional view of another air lock;

FIG. 4 is an enlarged front view showing parts of a frying conveyor and a supporting conveyor; and FIG. 5 is an enlarged perspective view showing parts of cooling panels and a cooling conveyor.

Figure 1:
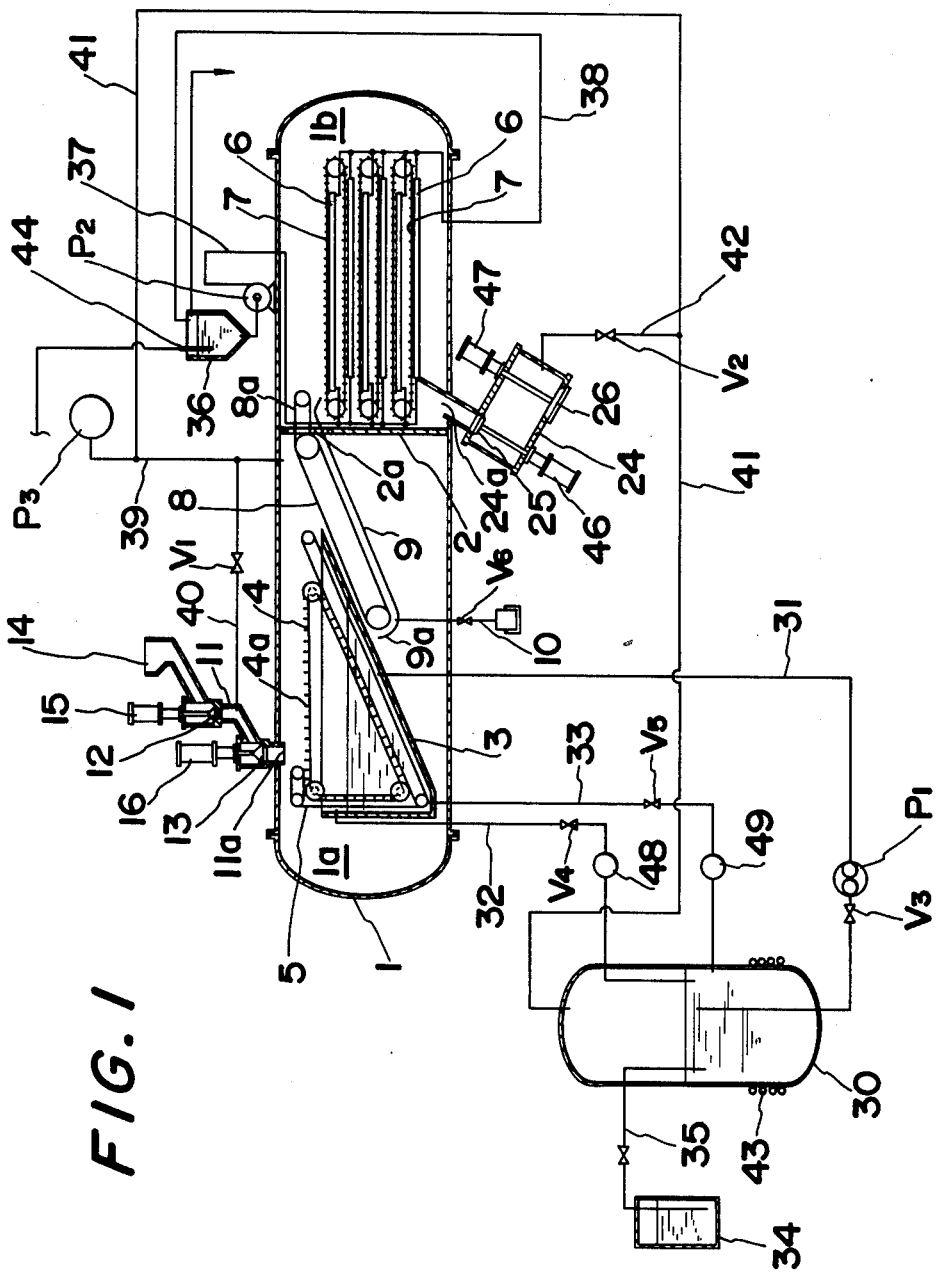
FIG. 1 is an elevational, sectional view of the apparatus.

The interior of a vacuum tank 1 has a frying zone 1a and a cooling zone 1b. A partition wall 2 is provided between the zones. An oil tank 3 which has a substantially triangular sectional form and whose top is open is installed in the frying zone 1a. A frying conveyor 4 has a vertical descending portion and an oblique rising portion immersed in the oil tank 3. The conveyor 4 is a net conveyor having plates 4a projecting from the upper surface at equal intervals. A supporting net conveyor 5 is arranged subjacent the oblique portion of the frying conveyor 4. A material to be processed is held between the conveyors 4 and 5 so as to be raised above the oil tank 3. A plurality of horizontal cooling panels 6 is spacedly superposed in the cooling zone 1b. Conveyors 7 having plates 7b mounted on an endless chain 7a at equal intervals move horizontally over the cooling panels 6. Conduits 6a (FIG. 5) connected with a cooling water tank circulate cooling water in the cooling panels 6 whose ends are staggered. Each cooling conveyor 7 moves along two superposed cooling panels 6. Thus, the material being cooled is gradually transferred from the topmost to the lowermost panel. A transfer conveyor 8 connects the supporting conveyor 5 and the uppermost cooling conveyor 7. A part 8a of the conveyor 8 passes through an opening 2a provided in the partition wall 2 and is situated above the uppermost cooling conveyor 7. The transfer conveyor 8 is a net conveyor. An oil pan 9 is arranged under the conveyor 8. One end of a pipe 10 which extends out of the vacuum tank 1 is connected to the bottom part 9a of the oil pan 9. Thus, oil which drops from the material being transferred on the conveyor 8 can be collected and taken out.

An air lock 11 provides a passage for introducing the material to be processed. A portion 11a of the air lock 11 is connected with the frying zone 1a. The air lock extends between two shut-off valves 12 and 13. Thus, the interior of the vacuum tank 1 is shut off from the atmosphere. As shown in FIG. 2, the valves 12, 13 comprise valve bodies 12a, 13a and doors 12b, 13b which operate jointly with the valve bodies. The doors 12b, 13b temporarily catch the material introduced into the air lock 11 from a hopper 14 disposed on the upper end of the air lock, while the valve bodies 12a, 13a seal the vacuum tank 1 from the atmosphere. The valves 12, 13 are actuated by air cylinders 15, 16, and associated ports 17a, 17b and 18a, 18b are opened and closed with a time difference. Each valve body 12a (13a) and the corresponding door 12b (13b) are interlocked by a rod 19 (20) whose one end 19a (20a) is pivotally mounted on the door 12b (13b) and whose other end 19b (20b) is slidably fitted on the valve body 12a (13a). When the valve body 12a (13a) moves upwards, the door 12b (13b) is turned by the interlocking rod 19 (20) on a pivot 21 (22). The material which moves through the air lock 11 is stopped by the door 12b (13b), and it cannot advance unless the valve body 12a (13a) fully opens the associated port. Therefore, a fixed quantity of the material is fed from the hopper 14 into the vacuum tank 1. A phototube assembly 23 automatically detects the quantity of the material to be processed. Another air lock 24 is connected with a discharge port 24a of the cooling zone 1b and includes spaced shut-off valves 25, 26 for opening and closing ports 27, 28. A door 29 adapted to shut off the passage through the air lock 24 is disposed close to the vacuum tank 1. An actuating mechanism not illustrated in the drawing opens the door 29 after opening of the valve 25 and closes the door 29 before the shut-off valve 25. The time difference prevents the processed material from remaining on the valve 25 and from being nipped in the port 27. An oil heating container 30 is connected with the tank 3 through a delivery pipe 31, an overflow pipe 32 and a discharge pipe 33. The oil heated to frying temperature is fed to the oil tank 3 by a pump $P_1$ in the delivery pipe 31. At the end of a run, the oil can flow back to the container 30 through the pipe 33. An oil storage tank 34 is connected with the container 30 by a pipe 35. A cooling water container 36 and the cooling panels 6 are connected by pipes 37 and 38 and a circulating pump $P_2$.

The vacuum tank 1 is connected with a vacuum pump $P_3$ by a suction pipe 39. A first branch pipe 40 is connected to a chamber between the shut-off valves 12 and 13 in the air lock 11. A second branch pipe 41 is connected to the oil heating container 30. A third branch pipe 42 is connected to a chamber between the shut-off valves 25 and 26 in the air lock 24.

The branch pipe 40 and the branch pipe 42 are provided with magnet valves $V_1$ and $V_2$. Thus, during introduction and discharge of material, the tank 1 and the container 30 can be maintained at a vacuum.

A heater 43 is mounted on the container 30, and a heater 44 in the tank 36 may adjust the temperature of the cooling water. Air cylinders 46, 47 actuate the shut-off valves 25 and 26, respectively. Numerals 48 and 49 indicate filters. Valves $V_3$, $V_4$, $V_5$ and $V_6$ control the flow of oil in pipes 31, 32, 33. Each of the conveyors 4, 5, 7 and 8 extends in an endless loop, and all the conveyors are moved in unison by interlocked drives.

A snack food may be prepared in the afore-described apparatus from apples which have undergone peeling, removal of cores, cleaning, and slicing to a suitable thickness (preferably about 5 mm to prevent crumbling). The dried, preprocessed material is fried in the oil tank 3 at 120° – 130° C on the frying conveyor 4. The fried material is transferred to the cooling panels 6 by the conveyor 8 and gradually cooled and solidified while being moved by the cooling conveyors 7. Since all these operations are carried out in a vacuum, the fried material is expanded and is solidified in the expanded state. The vacuum should be 0 – 160 mm Hg. The cooling and solidification time can be controlled by appropriately selecting the transfer speed of the material and the length of the cooling panels 6. The processed material is discharged from the vacuum tank 1 and transported away from the tank by a conveyor 50.

What is claimed is:

1. Food processing apparatus comprising:
   a. a tank;
   b. means for evacuating the interior of said tank;
   c. a vessel in said interior adapted to hold oil;
   d. means for heating the oil in said vessel to a frying temperature;
   e. first air lock means for introducing the material to be fried into said interior;
   f. first conveyor means movable in said interior for receiving the introduced material and for conveying the same through said oil, said conveyor means having a portion descending inward of said vessel and another portion rising outward of said vessel, whereby the conveyed material is fried in said oil;
   g. second conveyor means movable in said interior subjacent said rising portion of the first conveyor means for receiving said fried material from said first conveyor means and for carrying the same out of said vessel;
   h. a plurality of cooling panels spaced from said vessel, said panels extending horizontally in vertically spaced relationship, each panel having a top surface;
   i. third conveyor means for receiving said fried material from said second conveyor means and for moving the same toward said panels;
   j. fourth conveyor means associated with each of said panels for moving the fried material along the top surface of the associated panel, whereby said fried material is cooled, said fourth conveyor means including one conveyor associated with the topmost panel and another conveyor associated with the lowermost panel, said third conveyor means transferring the fried material to said one conveyor;
   k. second air lock means for releasing the cooled material from said interior, said first and second air lock means limiting entry of atmospheric air into said interior, said other conveyor discharging the cooled material to said second air lock means.

2. Apparatus as set forth in claim 1, further comprising a partition wall dividing said interior into a frying zone and a cooling zone, said vessel being arranged in said frying zone, said cooling panels being arranged in said cooling zone, and said third conveyor means passing through an opening in said partition wall between said zones.

3. Apparatus as set forth in claim 1, further comprising circulating means for circulating a cooling fluid through said cooling panels, and temperature control means for varying the temperature of the circulated cooling fluid independently of the temperature of said oil.

* * * * *